(12) United States Patent
Coker et al.

(10) Patent No.: US 9,236,066 B1
(45) Date of Patent: Jan. 12, 2016

(54) ATOMIC WRITE-IN-PLACE FOR HARD DISK DRIVES

(71) Applicant: HGST Netherlands B.V., Amsterdam (NL)

(72) Inventors: Jonathan D. Coker, Rochester, MN (US); David R. Hall, Rochester, MN (US); Shad H. Thorstenson, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/604,446

(22) Filed: Jan. 23, 2015

(51) Int. Cl.
G11B 27/36 (2006.01)
G11B 5/09 (2006.01)
G11B 5/012 (2006.01)

(52) U.S. Cl.
CPC ........................ *G11B 5/012* (2013.01)

(58) Field of Classification Search
None
See application file for complete search history.

(56) References Cited

U.S. PATENT DOCUMENTS

| | | | |
|---|---|---|---|
| 7,133,241 B2 * | 11/2006 | Che et al. ................ | 360/75 |
| 8,006,027 B1 | 8/2011 | Stevens et al. | |
| 8,578,122 B2 * | 11/2013 | Coker et al. ................ | 711/170 |
| 8,593,748 B1 | 11/2013 | Bandic et al. | |
| 8,599,507 B2 | 12/2013 | Sanvido et al. | |
| 8,631,197 B2 | 1/2014 | Hall | |
| 8,654,472 B2 | 2/2014 | Hall et al. | |
| 8,681,443 B2 | 3/2014 | Hall | |
| 8,941,943 B1 * | 1/2015 | Coker et al. ................ | 360/75 |
| 2014/0019681 A1 | 1/2014 | Huff et al. | |
| 2014/0055883 A1 | 2/2014 | Dhanda et al. | |
| 2014/0177085 A1 | 6/2014 | Naga et al. | |

OTHER PUBLICATIONS

He et al., "Novel Address Mappings for Shingled Write Disks," Department of Computer Science, University of Minnesota, Jun. 2014, 5 pp.

* cited by examiner

*Primary Examiner* — K. Wong
(74) *Attorney, Agent, or Firm* — Shumaker & Sieffert, P.A.

(57) ABSTRACT

In general, techniques are described for writing data to a storage device that comprises an interface and a controller. The interface may receive a request to sequentially write data stored in a first group of tracks to an I-region, where the first group of tracks was also previously written. The controller may move data stored in a second group of consecutive tracks different than the first group of tracks from the I-region to an E-region, the second group having cardinality equal to the tracks that must be moved for the first group to be written sequentially in the I-region. The E-region comprises a portion of the storage device reserved for temporary storage. The controller may determine a position of the I-region where data from one of the second group was previously stored, and write data from the first group of tracks sequentially to the I-region, starting at the position.

20 Claims, 5 Drawing Sheets

|   | T1 | T2 | T3 | T4 | T5 | T6 | T7 |
|---|---|---|---|---|---|---|---|
| I-Region Tracks | 1 | 1 | 1 | 1 | 1 | 1 | 1 |
| | 2 | - | - | - | - | - | - |
| | 3 | 5 | 7 | 9 | - | - | 6 |
| | 4 | 6 | 8 | 10 | - | 5 | 7 |
| | 5 | 7 | 9 | - | - | 6 | 8 |
| | 6 | 8 | 10 | - | 5 | 7 | 9 |
| | 7 | 9 | - | - | 6 | 8 | 10 |
| | 8 | 10 | - | 5 | 7 | 9 | - |
| | 9 | - | - | 6 | 8 | 10 | - |
| | 10 | - | 5 | 7 | 9 | - | - |
| | 11 | 11 | 6 | 8 | 10 | - | 5 |
| | 12 | 12 | - | - | - | - | - |
| | 13 | 13 | 13 | 13 | 13 | 13 | 13 |
| E-Region Tracks | - | 2 | 2 | 2 | 2 | 2 | 2 |
| | - | 3 | 3 | 3 | 3 | 3 | 3 |
| | - | 4 | 4 | 4 | 4 | 4 | 4 |
| | - | - | 11 | 11 | 11 | 11 | 11 |
| | - | - | 12 | 12 | 12 | 12 | 12 |

FIG. 3

|  | T1 | T2 | T3 | T4 | T5 | T6 | T7 |
|---|---|---|---|---|---|---|---|
| I-Region Tracks | 1 | 1 | 1 | 1 | 1 | 1 | 1 |
| | 2 | 2 | - | - | - | - | - |
| | 3 | 3 | 7 | 9 | - | - | 6 |
| | 4 | 4 | 8 | 10 | - | 5 | 7 |
| | 5 | - | 9 | - | - | 6 | 8 |
| | 6 | 8 | 10 | - | 5 | 7 | 9 |
| | 7 | 9 | - | - | 6 | 8 | 10 |
| | 8 | 10 | - | 5 | 7 | 9 | - |
| | 9 | - | - | 6 | 8 | 10 | - |
| | 10 | - | 5 | 7 | 9 | - | - |
| | 11 | 11 | 6 | 8 | 10 | - | 5 |
| | 12 | 12 | - | - | - | - | - |
| | 13 | 13 | 13 | 13 | 13 | 13 | 13 |
| E-Region Tracks | - | 5 | 5-7 | 5-7 | 5-7 | 5-7 | 5-7 |
| | - | 6 | 2-4 | 2-4 | 2-4 | 2-4 | 2-4 |
| | - | 7 | 11-12 | 11-12 | 11-12 | 11-12 | 11-12 |
| | - | - | - | - | - | - | - |
| | - | - | - | - | - | - | - |

FIG. 4

ATOMIC WRITE-IN-PLACE FOR HARD DISK DRIVES

TECHNICAL FIELD

The disclosure relates to shingled magnetic recording hard disk drives.

BACKGROUND

Shingled magnetic recording (SMR) regions restrict the ability to write data into its current location. This restriction is due to the size of SMR regions and a magnetic head that reads and writes the date into the tracks of an SMR region. The magnetic head is wider than the target track width it writes to, causing this difficulty. The traditional approach for sequential write operations is to write the first few tracks of sequential data into a scratch region, creating a validity hole in the data's original location. Data is then written in place in the validity hole. In this implementation, each sequential write will result in additional utilization of scratch space.

Such techniques for handling various writes and re-writes of data in a shingled region of an SMR hard disk drive (HDD) face numerous inefficiencies. It may be difficult to rewrite the shingled region without writing additional tracks to an E-region of the SMR HDD. Further, E-regions may contain many stale copies of the same logical sectors, which may require compaction to free. These writes may further be encountered in looped or repeated benchmarks, reducing overall efficiency of the writes. Further, the initial sequential write may be fragmented, potentially leading to a degradation in read performance.

SUMMARY

In one example, the disclosure is directed to a method that may include receiving, by a controller of a storage device, a request to sequentially write data stored in a first group of one or more tracks of a plurality of tracks to an I-region of the storage device, wherein the I-region comprises the plurality of tracks, and wherein the plurality of tracks were previously written to the I-region, and moving, by the controller, data stored in a second group of one or more consecutive tracks of the plurality of tracks from the I-region to an E-region of the storage device, wherein the second group has a cardinality equal to a number of tracks that must be moved for the first group to be capable of being written sequentially in the I-region, wherein the tracks in the first group of one or more tracks are different than the tracks in the second group of one or more consecutive tracks, and wherein the E-region comprises a portion of the storage device reserved for temporary storage. The method may also include determining, by the controller, a position of the I-region where data from one of the one or more tracks of the second group was previously stored, wherein the position indicates a starting point for writing the first group of one or more tracks to the I-region, and writing, by the controller, data from the first group of one or more tracks sequentially to the I-region, wherein a sequentially first track of the first group of one or more tracks is written to the position.

In another example, the disclosure is directed to a device comprising a storage device comprising an I-region and an E-region, wherein the I-region comprises a plurality of tracks, and wherein the E-region comprises a portion of the storage device reserved for temporary storage, and a controller. The controller may be configured to receive a request to sequentially write data stored in a first group of one or more tracks of the plurality of tracks to the I-region of the storage device, wherein the plurality of tracks were previously written to the I-region, and move data stored in a second group of one or more consecutive tracks of the plurality of tracks from the I-region to the E-region of the storage device, wherein the second group has cardinality equal to a number of tracks that must be moved for the first group to be capable of being written sequentially in the I-region, and wherein the tracks in the first group of one or more tracks are different than the tracks in the second group of one or more consecutive tracks. The controller may be further configured to determine a position of the I-region where data from one of the one or more tracks of the second group was previously stored, wherein the position indicates a starting point for writing the first group of one or more tracks to the I-region, and write the data from the first group of one or more tracks sequentially to the I-region, wherein a sequentially first track of the first group of one or more tracks is written to the position.

In another example, the disclosure is directed to a device comprising means for receiving a request to sequentially write data stored in a first group of one or more tracks of a plurality of tracks to an I-region of a storage device, wherein the I-region comprises the plurality of tracks, and wherein the plurality of tracks were previously written to the I-region. The device may also comprise means for moving data stored in a second group of one or more consecutive tracks of the plurality of tracks from the I-region to an E-region of the storage device, wherein the second group has cardinality equal to a number of tracks that must be moved for the first group to be capable of being written sequentially in the I-region, wherein the tracks in the first group of one or more tracks are different than the tracks in the second group of one or more consecutive tracks, and wherein the E-region comprises a portion of the storage device reserved for temporary storage. The device may further comprise means for determining a position of the I-region where data from one of the one or more tracks of the second group was previously stored, wherein the position indicates a starting point for writing the first group of one or more tracks to the I-region, and means for writing the data from the first group of one or more tracks sequentially to the I-region, wherein a sequentially first track of the first group of one or more tracks is written to the position.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a conceptual table illustrating an example series of write operations on an SMR region, in accordance with one or more techniques of this disclosure.

FIG. 4 is a conceptual table illustrating a second example series of write operations on an SMR region, in accordance with one or more techniques of this disclosure.

DETAILED DESCRIPTION

In general, this disclosure describes techniques for managing repeated sequential writes in shingled magnetic recording (SMR) hard disk drives (HDDs). More specifically, the techniques may enable an SMR HDD to move data not currently written by the host out of the shingled region to create a "hole" or virtual guard band that enable procession of the data on subsequent writes. By creating the virtual guard bad, techniques of this disclosure may reduce the amount of data that needs to be written in the scratch area over time, which may improve the performance of the SMR HDD. Techniques described herein may also enable an SMR HDD to perform unlimited sequential host writes into the same SMR region without requiring defragmentation of the region.

Figure 1:
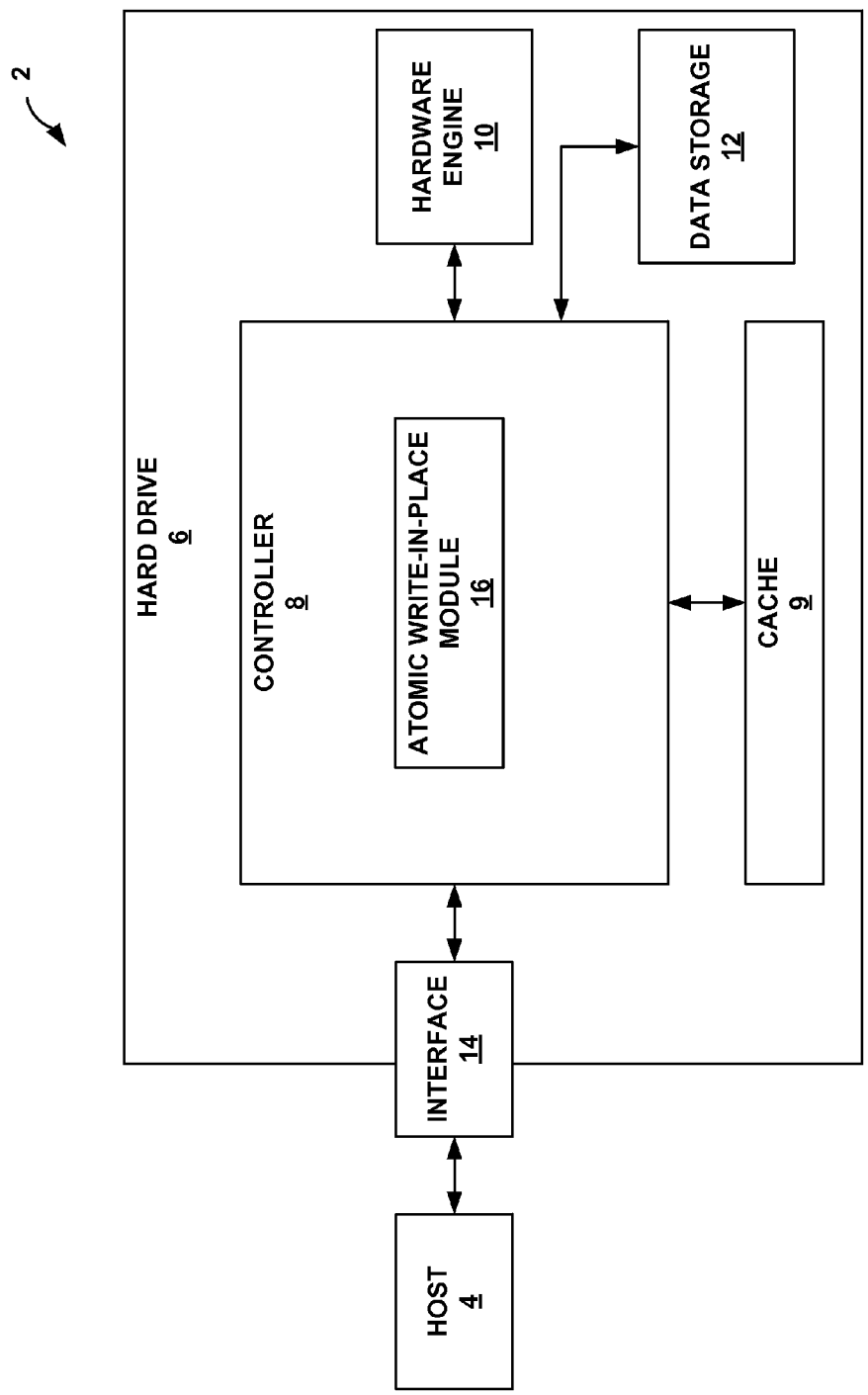
FIG. 1 is a conceptual and schematic block diagram illustrating an example storage environment in which a hard drive may function as a storage device for a host device, in accordance with one or more techniques of this disclosure.

FIG. 1 is a conceptual and schematic block diagram illustrating an example storage environment 2 in which hard drive 6 may function as a storage device for host device 4, in accordance with one or more techniques of this disclosure. For instance, host device 4 may utilize non-volatile memory devices included in hard drive 6 to store and retrieve data. In some examples, storage environment 2 may include a plurality of storage devices, such as hard drive 6, that may operate as a storage array. For instance, storage environment 2 may include a plurality of hard drives 6 configured as a redundant array of inexpensive/independent disks (RAID) that collectively function as a mass storage device for host device 4. While techniques of this disclosure generally refer to storage environment 2 and hard drive 6, techniques described herein may be performed in any storage environment that utilizes tracks of data.

Storage environment 2 may include host device 4 which may store and/or retrieve data to and/or from one or more storage devices, such as hard drive 6. As illustrated in FIG. 1, host device 4 may communicate with hard drive 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Typically, host device 4 comprises any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. For the purpose of executing techniques of this disclosure, host device 4 may send write requests to controller 8 via interface 14 for the purpose of re-writing data stored in a first group of one or more tracks to a SMR region using techniques described herein.

As illustrated in FIG. 1 hard drive 6 may include a controller 8, a cache 9, a hardware engine 10, data storage device 12, and an interface 14. In some examples, hard drive 6 may include additional components not shown in FIG. 1 for ease of illustration purposes. For example, hard drive 6 may include power delivery components, including, for example, a capacitor, super capacitor, or battery; a printed board (PB) to which components of hard drive 6 are mechanically attached and which includes electrically conductive traces that electrically interconnect components of hard drive 6, and the like. In some examples, the physical dimensions and connector configurations of hard drive 6 may conform to one or more standard form factors. Some example standard form factors include, but are not limited to, 3.5" hard disk drive (HDD), 2.5" HDD, or 1.8" HDD.

In some examples, cache 9 may store information for processing during operation of hard drive 6. In some examples, cache 9 is a temporary memory, meaning that a primary purpose of cache 9 is not long-term storage. Cache 9 on hard drive 6 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, hard drive 6 may be a shingled magnetic recording (SMR) hard drive. With SMR, relatively wide tracks are written to hard drive 6 and successively written data tracks partially overlap the previously written data tracks. This increases the density of hard drive 6 by packing the tracks closer together. When energized, a magnetic field emanating from the poles writes and erases data by flipping the magnetization of small regions, called bits, on spinning platters, such as data storage 12, directly below. SMR hard drives may enable high data densities and are particularly suited for continuous writing/erasing.

Data storage 12 may be configured to store larger amounts of information than cache 9. Data storage 12 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Data storage 12 may be one or more magnetic platters in hard drive 6, each platter containing one or more regions of one or more tracks of data.

In examples where hard drive 6 is an SMR hard drive, data storage 12 portion of hard drive 6 may comprise two types of regions: I-regions and E-regions. Tracks on a disk surface may be organized into a plurality of shingled regions, called I-regions. The direction of the shingled writing for an I-region can be from an inner diameter (ID) to an outer diameter (OD) or from OD to ID. The disk may also be shingled in both directions on the same surface, with the two zones meeting approximately at the mid-diameter point. The write performance of hard drive 6 correlates with the number of tracks grouped together in each region such that, as the number of tracks increases, the write performance of hard disk 6 may decrease when the writes are random or smaller than the size of the grouped tracks. Once written in the shingled structure, an individual track may not be able to be updated in place because re-writing the track in place may overwrite and destroy the data in the overlapping tracks.

In an attempt to improve the performance of SMR drives, a portion of the magnetic media may be allocated to one or more so-called "exception regions" (E-regions) which are used as staging areas for data which will ultimately be written to an I-region. The E-region is sometimes referred to as an E-cache. Since most of the data in an SMR drive is expected to be stored sequentially in I-regions, the data records that are not currently stored in the I-regions can be thought of as "exceptions" to sequential I-region storage. However, each E-region consumes a portion of data storage 12 such that there is less space available for I-regions. When receiving a request to write data to the tracks of the I-region, by moving other data from the I-region to the E-region rather than writing part of the requested data to the E-region before writing the rest to the I-region, techniques of this disclosure may reduce the size of the E-regions of data storage 12, which may enable data storage 12 to have larger and/or more I-regions and store more data.

Hard drive 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express (PCIe). The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit hard drive 6 to receive power from host device 4.

In the example of FIG. 1, hard drive 6 includes hardware engine 10, which may represent the hardware responsible for interfacing with the storage medium. Hardware engine 10 may, in the context of a platter-based hard drive, represent the magnetic read/write head and the accompanying hardware to configure, drive and process the signals sensed by the magnetic read/write head.

Hard drive 6 includes controller 8, which may manage one or more operations of hard drive 6. Controller 8 may interface with host device 4 via interface 14 and manage the storage of data to and the retrieval of data from data storage 12 accessible via hardware engine 10. Controller 8 may, as one example, manage writes to and reads from the memory devices, e.g., Negated AND (NAND) flash memory chips or a hard disk drive platter. In some examples, controller 8 may be a hardware controller. In other examples, controller 8 may be implemented into hard drive 6 as a software controller. Controller 8 may further include one or more features that may perform techniques of this disclosure, such as atomic write-in-place module 16.

Host 4 may, in this respect, interface with various hardware engines, such as hardware engine 10, to interact with various sensors. Host 4 may execute software, such as the above noted operating system, to manage interactions between host 4 and hardware engine 10. The operating system may perform arbitration in the context of multi-core CPUs, where each core effectively represents a different CPU, to determine which of the CPUs may access hardware engine 10. The operating system may also perform queue management within the context of a single CPU to address how various events, such as read and write requests in the example of hard drive 6, issued by host 4 should be processed by hardware engine 10 of hard drive 6.

Techniques of this disclosure may enable controller 8 to handle sequential write requests on tracks of data in data storage 12. Controller 8 may receive a request from host 4 via interface 14 to sequentially write data stored in a first group of one or more tracks. The first group of one or more tracks may be a portion of a plurality of tracks in an I-region of data storage 12 of hard drive 6. Data in the plurality of tracks, including data in the first group of one or more tracks, may have been previously written to the I-region. In some examples, the data in the sequential write request has been updated and is different than the previous forms already stored in the I-region. In other examples, the data in the sequential write request is the same as the previous forms already stored in the I-region, essentially defragmenting data storage 12 of hard drive 6 by moving the data to a new portion of data storage 12 and storing it sequentially.

Rather than writing data from a portion of the first group of one or more tracks to the E-region before writing data from the remainder of the first group of one or more tracks to the I-region, controller 8 may move data stored in a second group of one or more consecutive tracks of the plurality of tracks from the I-region of data storage 12 to an E-region of data storage 12 of hard drive 6. The second group may have cardinality equal to a number of tracks that must be moved for the first group to be capable of being written sequentially in the I-region. In some examples, this cardinality may be dictated by a head width of hard drive 6 or other constraints of the storage device, such as tracks per I-region. In other examples, adjacent, or far, track interference (xTI) may cause magnetic wear, which may require that one or more additional tracks may need to be moved beyond the need based on the head width. Further, the tracks in the second group of one or more consecutive tracks may be different than the first group of one or more tracks.

Controller 8 may determine a position of the I-region of data storage 12 where data from one of the one or more tracks of the second group was previously stored. The position indicates a starting point for writing data from the first group of one or more tracks to the I-region. Controller 8 may write data from the first group of one or more tracks sequentially to the I-region. The first track of the first group of one or more tracks is sequentially written to the above-determined position. This process is described in greater detail with respect to FIGS. 3-4.

By moving data not associated with the tracks being rewritten in the I-region, the entirety of the first group of one or more tracks may be written sequentially in the I-region. Data is likely to be read in a similar order as it is written, and data in one track that is written along with data in a different track is likely to be read at the same time. By writing the data sequentially in the same I-region, there may be fewer seek operations that a hard drive may have to make in order to read or write the data, which may increase the speeds of read and write operations of a SMR hard drive. Further, techniques described herein may decrease the decrease the amount of storage necessary in an E-region of a SMR hard drive, maximizing the space available for I-regions, which, as described above, may increase overall efficiency of a SMR hard drive. Data is also more likely to be read soon after it is written, meaning that moving data not associated with the first group of one or more tracks to the E-region may enable data that is more likely to be accessed immediately to be written sequentially to the I-region for expedient operations.

Figure 2:
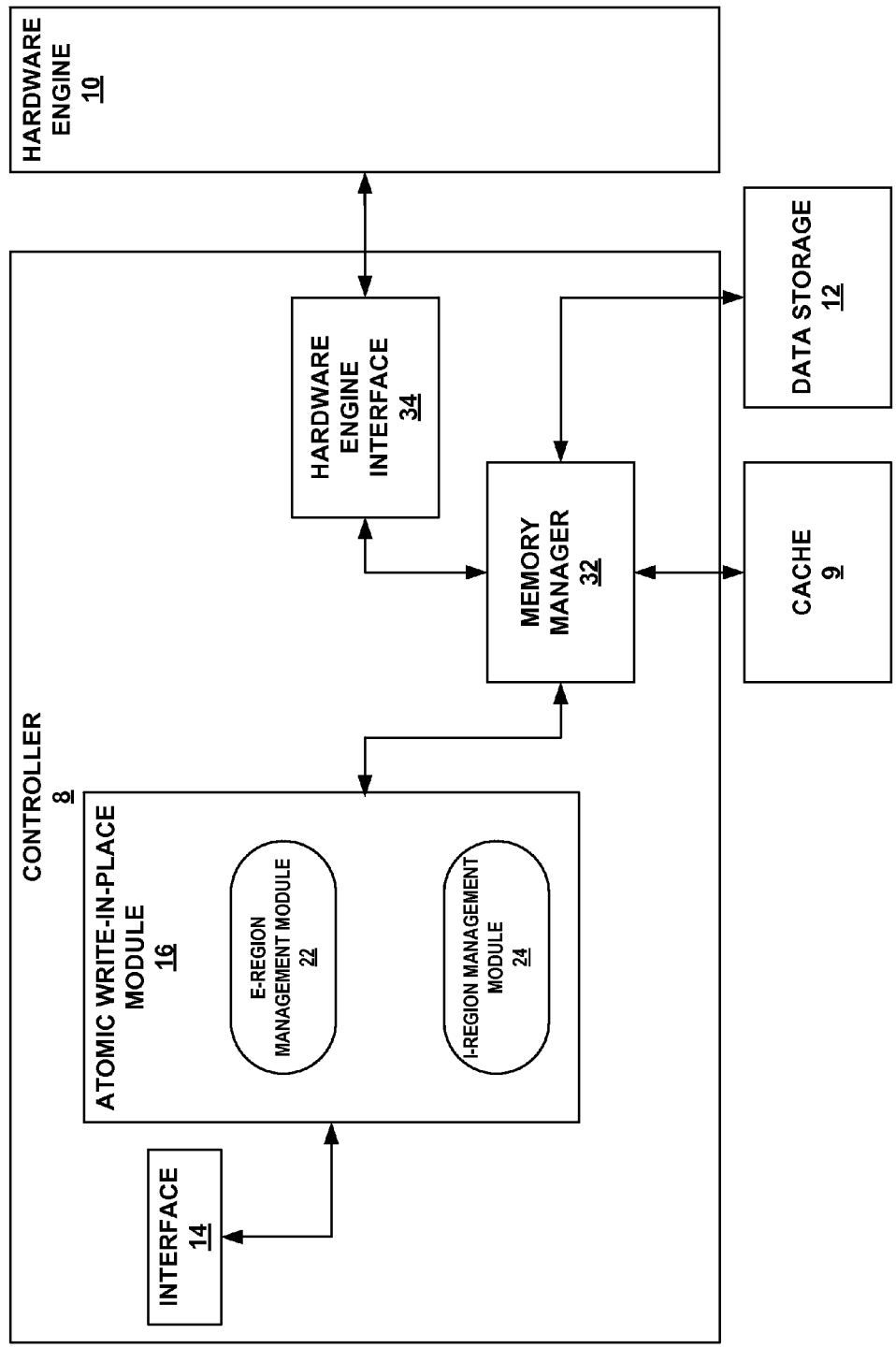
FIG. 2 is a block diagram illustrating the controller and other components of the hard drive of FIG. 1 in more detail.

FIG. 2 is a block diagram illustrating controller 8 of FIG. 1 in more detail. In the example of FIG. 2, controller 8 includes interface 14, atomic write-in-place module 16, memory manager unit 32, and hardware engine interface unit 34. Memory manager unit 32 and hardware engine interface unit 34 may perform various functions typical of a controller on a hard drive. For instance, hardware engine interface unit 34 may represent a unit configured to facilitate communications between the hardware controller 8 and the hardware engine 10. Hardware engine interface unit 34 may present a standardized or uniform way by which to interface with hardware engine 10. Hardware engine interface 34 may provide various configuration data and events to hardware engine 10, which may then process the event in accordance with the configuration data, returning various different types of information depending on the event. In the context of an event requesting that data be read (e.g., a read request), hardware engine 10 may return the data to hardware engine interface 34, which may pass the data to memory manager unit 32. Memory manager unit 32 may store the read data to cache 9 and return a pointer or other indication of where this read data is stored to hardware engine interface 34. In the context of an event involving a request to write data (e.g. a write request), hardware engine 10 may return an indication that the write has completed to hardware engine interface unit 34. In this respect, hardware engine interface unit 34 may provide a protocol and handshake mechanism with which to interface with hardware engine 10.

Atomic write-in-place module 16 includes various modules, including E-region management module 22 and I-region management module 24. The various modules of atomic write-in-place module 16 may be configured to perform various techniques of this disclosure, including the technique described above with respect to FIG. 1. E-region management module 22 and I-region management module 24 may perform operations described herein using software, hardware, firmware, or a mixture of both hardware, software, and firmware residing in and/or executing on hard drive 6.

Using E-region management module 22 and I-region management module 24, controller 8 may perform techniques of this disclosure to write data to data storage 12 of hard drive 6. Techniques of this disclosure may enable controller 8 to handle requests to sequentially write data previously stored on tracks in data storage 12. I-region management module 24 of controller 8 may receive a request from host 4 via interface 14 to sequentially write data stored in a first group of one or more tracks to the I-region. The first group of one or more tracks may be a portion of a plurality of tracks in an I-region of data storage 12 of hard drive 6. Data in the plurality of tracks, including data in the first group of one or more tracks, may have been previously written to the I-region.

Rather than writing data from a portion of the first group of one or more tracks to the E-region before writing data from the remainder of the first group of one or more tracks to the I-region, E-region management module 22 of controller 8 may move data stored in a second group of one or more consecutive tracks of the plurality of tracks from the I-region of data storage 12 to an E-region of data storage 12 of hard drive 6. The second group may have cardinality equal to a number of tracks that must be moved for the first group to be capable of being written sequentially in the I-region. In some examples, this cardinality may be dictated by a head width of hard drive 6 or other constraints of the storage device, such as tracks per I-region. Further, the tracks in the second group of one or more consecutive tracks may be different than the first group of one or more tracks.

I-region management module 24 of controller 8 may then determine a position of the I-region of data storage 12 where data from one of the one or more tracks of the second group was previously stored. The position indicates a starting point for writing data from the first group of one or more tracks to the I-region. I-region management module 24 of controller 8 may then write data from the first group of one or more tracks sequentially to the I-region. Sequentially, the first track of the first group of one or more tracks is written to the above-determined position.

In some examples, before the above writing technique is performed, I-region management module 24 of controller 8 may receive a first, initial request to sequentially write data stored in the first group of one or more tracks to the I-region of data storage 12 of hard drive 6. E-region management module 22 may write a portion of the first group of one or more tracks to the E-region of data storage 12 of hard drive 6. I-region management module 24 may then write a remainder of the first group of one or more tracks to the I-region where the data of the portion of the first group was previously stored. While this may initially lead to a greater number of write operations performed in the E-region of data storage 12, there may be fewer overall write operations in the long-term by performing this initial method of writing data. For instance, if most write-in-place ranges are only written once prior to a defragmentation operation, the average E-region consumption may be less overall.

In some examples, I-region management module 24 may further create a buffer track to the I-region at a sequentially first track of the second group of consecutive tracks. A buffer track may be a track in an SMR hard drive that does not contain any data. Since tracks in an SMR hard drive overlap one another, a buffer track may be created in the SMR hard drive to reduce any read errors that may occur due to the overlapping tracks. If controller 8 is writing a group of tracks to data storage 12 of hard drive 6, it is likely that the group of tracks may be read together as well. Therefore, I-region management module 24 may skip writing any data to the sequentially first track of the second group of tracks, creating a buffer track, before the data from the first group of one or more tracks is written to the I-region. In such an example, the position where the sequentially first track of the first group of one or more tracks is written to may indicate a sequentially second track of the second group of consecutive tracks. In some examples, I-region management module 24 of controller 8 may further create a second buffer track to the I-region at a track following the sequentially last track of the first group of tracks by not writing any data to the sequentially last track of the first group of tracks, further reducing any read errors that may occur at the conclusion of the first group of one or more tracks.

In some examples, I-region management module 24 may receive a second request to sequentially write the data stored in the first group of one or more tracks to the I-region of data storage 12 of hard drive 6. In these examples, E-region management module 22 may move data stored in a third group of one or more consecutive tracks of the plurality of tracks from the I-region to the E-region of data storage 12 of hard drive 6. Like the second group of one or more consecutive tracks, the third group of one or more consecutive tracks has cardinality equal to a number of tracks that must be moved for the first group to be capable of being written sequentially to the I-region. Further, the third group of one or more consecutive tracks is different than both the first group and second group of tracks. I-region management module 24 may determine a second position of the I-region where data from one of the one or more tracks of the third group was previously stored. Much like the first position, the second position indicates a starting point for writing the first group of one or more tracks to the I-region. I-region management module 24 may then write the data from the first group of one or more tracks sequentially to the I-region, the sequentially first track of the first group being written to the second position. In some further examples, I-region management module 24 of controller 8 may skip writing data to the I-region at a sequentially first track of the third group of consecutive tracks, creating another buffer track. The second position would then indicate a sequentially second track of the third group of consecutive tracks.

In other examples, when I-region management module 24 receives a second request to sequentially write data stored in the first group of one or more tracks to the I-region of the storage device, I-region management module 24 of controller 8 may determine that the data stored in the first group of one or more tracks has previously been re-written to the I-region. In such a case, I-region management module 24 of controller 8 may determine a second position that is the same track as the sequentially first track of the first group of one or more tracks as currently written in the I-region. I-region management module 24 may then write the data from the first group of one or more tracks sequentially to the I-region, with the sequentially first track of the first group of one or more tracks written to the second position.

By moving data not associated with the tracks being rewritten in the I-region, the entirety of the first group of one or more tracks may be written sequentially in the I-region. Data is likely to be read in a similar order as it is written, and data in one track that is written along with data in a different track is likely to be read at the same time. By writing the data sequentially in the same I-region, there may be fewer seek operations that a hard drive may have to make between data in various tracks, increasing the efficiency of a SMR hard drive. Further, this decreases the number of operations that must be completed in an E-region of a SMR hard drive, maximizing the space available for I-regions, which, as described above, increases overall efficiency of a SMR hard drive. These techniques may further reduce defragmentation frequency when a fixed number of I-regions are required. As the E-region is filled, defragmentation allows space to be recovered. By consuming less of the one or more E-regions on a hard drive, defragmentation operations occur with less frequency. Data is also more likely to be read soon after it is written, meaning that moving data not associated with the first group of one or more tracks to the E-region will allow data that is more likely to be accessed immediately to be written sequentially to the I-region for expedient operations.

FIG. 3 is a conceptual table 40 illustrating an example series of write operations on an SMR region, in accordance with one or more techniques of this disclosure. In this example, the I-region and E-region shown may be an I-region and E-region of a data storage portion of a hard drive, such as data storage 12 of hard drive 6. Further, the I-region in this example has 13 tracks, while the E-region has 5 tracks. However, in other examples, the I-region and the E-region may have more tracks or less tracks. In other words, while the I-region in FIG. 3 has 13 tracks, techniques of this disclosure may be used with an I-region comprising more than 13 tracks or less than 13 tracks. Similarly, while the E-region in FIG. 3 has 5 tracks, techniques of this disclosure may be used with an E-region comprising more than 5 tracks or less than 5 tracks.

At time T1, the I-region has data written to each of tracks 1 through 13, while the E-region is empty. At time T2, a controller of the hard drive, such as controller 8 of hard drive 6, may receive a request to sequentially write data stored in a first group of tracks to the I-region. In this example, the first group of tracks consists of original tracks 5 through 10. Rather than write the data from original tracks 5, 6, and 7 to the E-region in order to clear space in the I-region for the remainder of the data (i.e., the data from original tracks 8, 9, and 10), controller 8 moves data stored in a second group of one or more consecutive tracks from the I-region to the E-region. In this example, controller 8 moves data from original tracks 2, 3, and 4, to the E-region. This opens enough space to allow original tracks 5, 6, 7, 8, 9, and 10 to be written sequentially in the I-region.

Controller 8 determines a position of the I-region where one of the second group of tracks was previously stored to indicate a starting point for writing the data from the first group of tracks to the I-region. In this example, the position is track 3, or the sequentially second track of the second group of consecutive tracks. This is because controller 8 has also created a buffer track to the I-region at position 2, or the sequentially first track of the second group of tracks. Controller 8 then writes the data from the first group of tracks sequentially to the I-region, starting at position 3. As such, the data from original track 5 is now stored in position 3, the data from original track 6 is now stored in position 4, the data from original track 7 is now stored in position 5, the data from original track 8 is now stored in position 6, the data from original track 9 is now stored in position 7, and the data from original track 10 is now stored in position 8. In this example, controller 8 has also created a second buffer track to position 9, following the sequentially final track of the first group.

At time T3, controller 8 receives a second request to sequentially write the data stored in the first group of tracks to the I-region. Again, controller 8 may move data stored in a group of tracks not associated with the first group of tracks from the I-region to the E-region. In this example, controller 8 moves the data originally stored in original tracks 11 and 12 to the E-region. This is because, in some examples, the magnetic head that reads and writes to storage device 12 of hard drive 6 may remain at the position after the final operation took place. For example, the final operation of T2 took place in creating the buffer track to the position of position 9 by not writing any data to position 9. Therefore, the head may be at position 10 during time T3. As such, the sequentially first track of the first group of tracks may be written to position 10. However, since data is stored in original tracks 11 and 12, that data must be moved to allow for a sequential write of the first group of tracks. Therefore, controller 8 may move the date originally stored in original tracks 11 and 12 to the E-region. Controller 8 may then write the data from original track 6 to position 11. The data stored in original track 13 may not be able to be moved. As such, controller 8 may create a buffer track at position 12 by not writing any data to position 12 in order to separate the data from the first group of tracks from the tracks at either end of the I-region (i.e., original tracks 1 and 13). Since a buffer track is already created at position 2, controller 8 may continue to write the remainder of the tracks starting at position 3. As such, the data from original track 5 is now stored in position 10, the data from original track 6 is now stored in position 11, the data from original track 7 is now stored in position 3, the data from original track 8 is now stored in position 4, the data from original track 9 is now stored in position 5, and the data from original track 10 is now stored in position 6. In this example, controller 8 has also created another buffer track to position 7, following the sequentially final track of the first group.

At time T4, controller 8 may receive yet another request to sequentially write the data stored in the first group to the I-region. The magnetic head is now positioned at track 8 of the I-region, since the last operation occurred at track position 7. However, due to the previous instances of moving data not associated with the first group to the E-region, there is now sufficient space to immediately begin writing the data from the first group of tracks to the I-region without moving data from any other track. As such, the data from original track 5 is now stored in position 8, the data from original track 6 is now stored in position 9, the data from original track 7 is now stored in position 10, the data from original track 8 is now stored in position 11, the data from original track 9 is now stored in position 3, and the data from original track 10 is now stored in position 4. In this example, controller 8 has also created another buffer track to position 5, following the sequentially final track of the first group, by skipping over position 5 and not writing any data to that position.

Times T5, T6, and T7 represent times at which controller 8 may receive further requests to sequentially write the data stored in the first group to the I-region. Each time, the magnetic head is positioned at the track after the final operation occurred during the previous sequential write operation. Further, due to the previous instances of moving data not associated with the first group to the E-region, there continues to be sufficient space to immediately write the data from the first group of tracks to the I-region without moving data from any other track. As opposed to techniques where a first portion of the first group of tracks is always written to the E-region before writing the remainder of the first group of tracks to the I-region, techniques described herein would store fewer instances of each piece of data, thereby reducing the amount of E-region storage needed and the amount of writes performed in the E-region.

By moving data not associated with the tracks being re-written in the I-region, the entirety of the first group of one or more tracks may be written sequentially in the I-region. Data is likely to be read in a similar order as it is written, and data in one track that is written along with data in a different track is likely to be read at the same time. By writing the data sequentially in the same I-region, there may be fewer seek operations that a hard drive may have to make between data in various tracks, increasing the efficiency of a SMR hard drive. Further, this decreases the number of operations that must be completed in an E-region of a SMR hard drive, maximizing the space available for I-regions, which, as described above, increases overall efficiency of a SMR hard drive. Data is also more likely to be read soon after it is written, meaning that moving data not associated with the first group of one or more tracks to the E-region will allow data that is more likely to be accessed immediately to be written sequentially to the I-region for expedient operations.

FIG. 4 is a conceptual table 50 illustrating a second example series of write operations on an SMR region, in accordance with one or more techniques of this disclosure. In this example, the I-region and E-region shown may be an I-region and E-region of a data storage portion of a hard drive, such as data storage 12 of hard drive 6. Further, the I-region in this example has 13 tracks, while the E-region has 5 tracks. However, in other examples, the I-region and the E-region may have more tracks or less tracks. In other words, while the I-region in FIG. 4 has 13 tracks, techniques of this disclosure may be used with an I-region comprising more than 13 tracks or less than 13 tracks. Similarly, while the E-region in FIG. 4 has 5 tracks, techniques of this disclosure may be used with an E-region comprising more than 5 tracks or less than 5 tracks.

At time T1, the I-region has data written to each of original tracks 1 through 13, while the E-region is empty. At time T2, a controller of the hard drive, such as controller 8 of hard drive 6, may receive a request to sequentially write data stored in a first group of tracks to the I-region. In this example, the first group of tracks consists of original tracks 5 through 10. In this first instance of receiving a sequential write request, controller 8 writes data stored in a portion of the first group of tracks to the E-region before writing data the data stored in a remainder of the first group of tracks to the I-region where the data of the portion of the first group was previously stored. As shown in FIG. 4, the portion of the first group includes the data previously stored in original tracks 5, 6, and 7. This clears room in the I-region for controller 8 to first not write any data to position 5, thereby creating a buffer track at track position 5, before writing the data originally stored in original tracks 8, 9, and 10 to positions 6, 7, and 8, respectively. As such, the data from original track 5 is now stored in the E-region, the data from original track 6 is now stored in the E-region, the data from original track 7 is now stored in the E-region, the data from original track 8 is now stored in position 6, the data from original track 9 is now stored in position 7, and the data from original track 10 is now stored in position 8. In this example, controller 8 has also created another buffer track to position 7, following the sequentially final track of the first group, by skipping over position 7 and not writing any data to that position.

At time T3, controller 8 receives a second request to sequentially write the data stored in the first group of tracks to the I-region. Again, controller 8 may move data stored in a group of tracks not associated with the first group of tracks from the I-region to the E-region. In this example, controller 8 moves the data originally stored in original tracks 11 and 12 to the E-region. This is because, in some examples, the magnetic head that reads and writes to storage device 12 of hard drive 6 may remain at the track after the final operation took place. For example, the final operation of T2 took place in creating the buffer track to the position of track 9, bypassing position 9. Therefore, the head may be at position 10 during time T3. As such, the sequentially first track of the first group of tracks may be written to position 10. However, since data is stored in original tracks 11 and 12, that data must be moved to allow for a sequential write of the first group of tracks. Therefore, controller 8 may move the data originally stored in original tracks 11 and 12 to the E-region. Controller 8 may then write the data from original track 6 to position 11. The data stored in original track 13 may not be able to be moved. As such, controller 8 may create a buffer track at position 12 by not writing any data at position 12, thereby separating the data from the first group of tracks from the tracks at either end of the I-region (i.e., original tracks 1 and 13). Since original track 1 may also not be moved, controller 8 may create another buffer track at position 2, moving the data stored in original track 2 to the I-region and bypassing writing any additional data at position 2. Controller 8 may further move original tracks 3 and 4 to the I-region to allow the first group of tracks to be written sequentially to the I-region. As such, the data from original track 5 is now stored in position 10, the data from original track 6 is now stored in position 11, the data from original track 7 is now stored in position 3, the data from original track 8 is now stored in position 4, the data from original track 9 is now stored in position 5, and the data from original track 10 is now stored in position 6. In this example, controller 8 has also created another buffer track at position 7, following the sequentially final track of the first group, by skipping over position 7 and not writing any data to that position. The E-region now contains a copy of the data from original tracks 5 through 7, along with data from original tracks 11-12 and 2-4.

At time T4, controller 8 may receive yet another request to sequentially write the data stored in the first group to the I-region. The magnetic head is now positioned at track 8 of the I-region, since the last operation occurred at track position 7. However, due to the previous instances of moving data not associated with the first group to the E-region, there is now sufficient space to immediately begin writing the data from the first group of tracks to the I-region without moving data from any other track. As such, the data from original track 5 is now stored in position 8, the data from original track 6 is now stored in position 9, the data from original track 7 is now stored in position 10, the data from original track 8 is now stored in position 11, the data from original track 9 is now stored in position 3, and the data from original track 10 is now stored in position 4. In this example, controller 8 has also created another buffer track to position 5, following the sequentially final track of the first group, by skipping over position 5 and not writing any data to that position.

Times T5, T6, and T7 represent times at which controller 8 may receive further requests to sequentially write the data stored in the first group to the I-region. Each time, the magnetic head is positioned at the track after the final operation occurred during the previous sequential write operation. Further, due to the previous instances of moving data not associated with the first group to the E-region, there continues to be sufficient space to immediately write the data from the first group of tracks to the I-region without moving data from any other track. By first using the technique where a portion of the first track is written to the E-region, as shown in FIG. 4, the overall amount of write operations in data storage 12 of hard drive 6 may be lesser than if executing the technique with respect to FIG. 3, though the initial write operation count may be higher.

Figure 5:
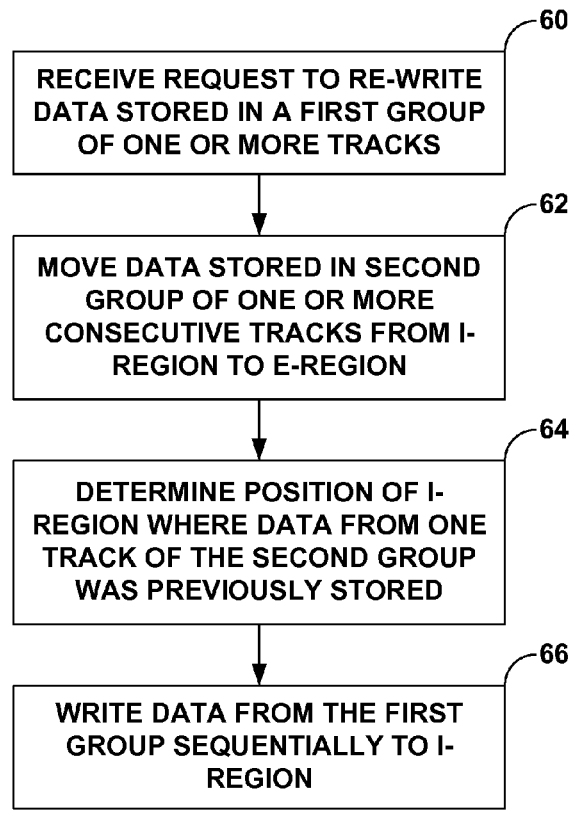
FIG. 5 is a flow diagram illustrating an exemplary operation of a storage device controller in performing various aspects of the data writing techniques described in this disclosure.

FIG. 5 is a flow diagram illustrating an exemplary operation of a storage device controller in performing various aspects of the data writing techniques described in this disclosure. In this example, I-region management module 24 (as shown in FIG. 2) of controller 8 (as shown in FIGS. 1 and 2) may receive a request from host 4 (as shown in FIG. 1) via interface 14 (as shown in FIGS. 1 and 2) to sequentially write data stored in a first group of one or more tracks (20). The first group of one or more tracks may be a portion of a plurality of tracks in an I-region of data storage 12 (as shown in FIGS. 1 and 2) of hard drive 6 (as shown in FIGS. 1 and 2). Data in the plurality of tracks, including data in the first group of one or more tracks, may have been previously written to the I-region.

Rather than writing data from a portion of the first group of one or more tracks to the E-region before writing data from the remainder of the first group of one or more tracks to the I-region, E-region management module 22 (as shown in FIG. 2) of controller 8 may move data stored in a second group of one or more consecutive tracks of the plurality of tracks from the I-region of data storage 12 to an E-region of data storage 12 of hard drive 6 (62). The second group may have cardinality equal to a number of tracks that must be moved for the first group to be capable of being written sequentially in the I-region. In some examples, this cardinality may be dictated by a head width of hard drive 6 or other constraints of the storage device, such as tracks per I-region. Further, the tracks in the second group of one or more consecutive tracks may be different than the first group of one or more tracks.

I-region management module 24 of controller 8 may then determine a position of the I-region of data storage 12 where data from one of the one or more tracks of the second group was previously stored (64). The position indicates a starting point for writing data from the first group of one or more tracks to the I-region. I-region management module 24 of controller 8 may then write data from the first group of one or more tracks sequentially to the I-region (66). Sequentially, the first track of the first group of one or more tracks is written to the above-determined position.

In some examples, before the above writing technique is performed, I-region management module 24 of controller 8 may receive a first, initial request to sequentially write data stored in the first group of one or more tracks to the I-region of data storage 12 of hard drive 6. E-region management module 22 may write a portion of the first group of one or more tracks to the E-region of data storage 12 of hard drive 6. I-region management module 24 may then write a remainder of the first group of one or more tracks to the I-region where the data of the portion of the first group was previously stored. While this may initially lead to a greater number of write operations performed in the E-region of data storage 12, there may be fewer overall write operations in the long-term by performing this initial method of writing data. For instance, if most write-in-place ranges are only written once prior to a defragmentation operation, the average E-region consumption may be less overall.

In some examples, I-region management module 24 may further create a buffer track in the I-region, wherein creating the buffer track comprises refraining from writing the data from the first group of one or more tracks to a sequentially first track of the second group of consecutive tracks. Since tracks in an SMR hard drive overlap one another, a buffer track may be created in the SMR hard drive to reduce any read errors that may occur due to the overlapping tracks. If controller 8 is writing a group of tracks to data storage 12 of hard drive 6, it is likely that the group of tracks may be read together as well. Therefore, I-region management module 24 may create a buffer track before the data from the first group of one or more tracks is written to the I-region by bypassing the sequentially first track of the second group of one or more tracks and not writing any data to that track. In such an example, the position where the sequentially first track of the first group of one or more tracks is written to may indicate a sequentially second track of the second group of consecutive tracks. In some examples, I-region management module 24 of controller 8 may further create a second buffer track in the I-region, wherein creating the second buffer track comprises refraining from writing the data from the first group of one or more tracks to a track following the sequentially last track of the first group of tracks, further reducing any read errors that may occur at the conclusion of the first group of one or more tracks.

In some examples, I-region management module 24 may receive a second request to sequentially write the data stored in the first group of one or more tracks to the I-region of data storage 12 of hard drive 6. In these examples, E-region management module 22 may move data stored in a third group of one or more consecutive tracks of the plurality of tracks from the I-region to the E-region of data storage 12 of hard drive 6. Like the second group of one or more consecutive tracks, the third group of one or more consecutive tracks has cardinality equal to a number of tracks that must be moved for the first group to be capable of being written sequentially to the I-region. Further, the third group of one or more consecutive tracks is different than both the first group and second group of tracks. I-region management module 24 may determine a second position of the I-region where data from one of the one or more tracks of the third group was previously stored. Much like the first position, the second position indicates a starting point for writing the first group of one or more tracks to the I-region. I-region management module 24 may then write the data from the first group of one or more tracks sequentially to the I-region, the sequentially first track of the first group being written to the second position. In some further examples, I-region management module 24 of controller 8 may create a buffer track in the I-region, wherein creating the buffer track comprises refraining from writing the data from the first group of one or more tracks to a sequentially first track of the third group of consecutive tracks. The second position would then indicate a sequentially second track of the third group of consecutive tracks.

In other examples, when I-region management module 24 receives a second request to sequentially write data stored in the first group of one or more tracks to the I-region of the storage device, I-region management module 24 of controller 8 may determine that the data stored in the first group of one or more tracks has previously been re-written to the I-region. In such a case, I-region management module 24 of controller 8 may determine a second position that is the same track as the sequentially first track of the first group of one or more tracks as currently written in the I-region. I-region management module 24 may then write the data from the first group of one or more tracks sequentially to the I-region, with the sequentially first track of the first group of one or more tracks written to the second position.

By moving data not associated with the tracks being rewritten in the I-region, the entirety of the first group of one or more tracks may be written sequentially in the I-region. Data is likely to be read in a similar order as it is written, and data in one track that is written along with data in a different track is likely to be read at the same time. By writing the data sequentially in the same I-region, there may be fewer seek operations that a hard drive may have to make between data in various tracks, increasing the efficiency of a SMR hard drive. Further, this decreases the number of operations that must be completed in an E-region of a SMR hard drive, maximizing the space available for I-regions, which, as described above, increases overall efficiency of a SMR hard drive. Data is also more likely to be read soon after it is written, meaning that moving data not associated with the first group of one or more tracks to the E-region will allow data that is more likely to be accessed immediately to be written sequentially to the I-region for expedient operations.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
   receiving, by a controller of a storage device, a request to sequentially write data stored in a first group of one or more tracks of a plurality of tracks to an I-region of the storage device, wherein the I-region comprises the plurality of tracks, and wherein the plurality of tracks were previously written to the I-region;
   moving, by the controller, data stored in each track of a second group of one or more consecutive tracks of the plurality of tracks from the I-region to an E-region of the storage device, wherein the second group has cardinality equal to a number of tracks that must be moved for the first group to be capable of being written sequentially in the I-region, wherein the tracks in the first group of one or more tracks are different than the tracks in the second group of one or more consecutive tracks, and wherein the E-region comprises a portion of the storage device reserved for temporary storage;
   determining, by the controller, a position of the I-region where data from one of the one or more tracks of the second group was previously stored, wherein the position indicates a starting point for writing the first group of one or more tracks to the I-region; and
   writing, by the controller, the data from the first group of one or more tracks sequentially to the I-region, wherein a sequentially first track of the first group of one or more tracks is written to the position.

2. The method of claim 1, further comprising:
   creating, by the controller, a buffer track in the I-region, wherein creating the buffer track comprises refraining from writing the data from the first group of one or more tracks to at a sequentially first track of the second group of consecutive tracks.

3. The method of claim 2, wherein the position indicates a sequentially second track of the second group of consecutive tracks.

4. The method of claim 2, further comprising:
   creating, by the controller, a second buffer track in the I-region, wherein creating the buffer track comprises refraining from writing the data from the first group of one or more tracks to at a track following the sequentially last track of the first group of tracks after the first group of tracks is written to the I-region.

5. The method of claim 1, further comprising:
   receiving, by the controller, a second request to sequentially write the data stored in the first group of the one or more tracks to the I-region of the storage device;
   moving, by the controller, data stored in a third group of one or more consecutive tracks of the plurality of tracks from the I-region to the E-region of the storage device, wherein the third group has a cardinality equal to a number of tracks that must be moved for the first group to be capable of being written sequentially in the I-region, wherein the tracks in the first group of one or more tracks are different than the tracks in the third group of one or more consecutive tracks, and wherein the third group of one or more consecutive tracks are different than the second group of one or more consecutive tracks;

determining, by the controller, a second position of the I-region where data from one of the one or more tracks of the third group was previously stored, wherein the position indicates a starting point for writing the first group of one or more tracks to the I-region; and writing, by the controller, the data from the first group of one or more tracks sequentially to the I-region, wherein a sequentially first track of the first group of one or more tracks is written to the second position.

6. The method of claim 5, further comprising:
creating, by the controller, a buffer track in the I-region, wherein creating the buffer track comprises refraining from writing the data from the first group of one or more tracks to at a sequentially first track of the third group of consecutive tracks, wherein the second position indicates a sequentially second track of the third group of consecutive tracks.

7. The method of claim 1, wherein the request is a second request, further comprising:
receiving, by the controller, a first request to sequentially write data stored in the first group of one or more tracks to the I-region of the storage device;
writing, by the controller, data stored in a portion of the first group of one or more tracks to the E-region of the storage device; and
writing, by the controller device, data stored in a remainder of the first group of one or more tracks to the I-region where the data of the portion of the first group was previously stored.

8. The method of claim 1, wherein the cardinality of the second group of one or more consecutive tracks is dictated by a head width of the storage device and one or more constraints of the storage device.

9. The method of claim 1, further comprising:
receiving, by the controller, a second request to sequentially write data stored in the first group of one or more tracks to the I-region of the storage device;
determining, by the controller, that the data stored in the first group of one or more tracks has been previously re-written to the I-region;
determining, by the controller, a second position that is the same track as the sequentially first track of the first group of one or more tracks; and
writing, by the controller, the data from the first group of one or more tracks sequentially to the I-region, wherein the sequentially first track of the first group of one or more tracks is written to the second position.

10. A device comprising:
a storage device comprising an I-region and an E-region, wherein the I-region comprises a plurality of tracks, and wherein the E-region comprises a portion of the storage device reserved for temporary storage; and
a controller configured to:
receive a request to sequentially write data stored in a first group of one or more tracks of the plurality of tracks to the I-region of the storage device, wherein the plurality of tracks were previously written to the I-region;
move data stored in each track of a second group of one or more consecutive tracks of the plurality of tracks from the I-region to the E-region of the storage device, wherein the second group has cardinality equal to a number of tracks that must be moved for the first group to be capable of being written sequentially in the I-region, and wherein the tracks in the first group of one or more tracks are different than the tracks in the second group of one or more consecutive tracks;

determine a position of the I-region where data from one of the one or more tracks of the second group was previously stored, wherein the position indicates a starting point for writing the first group of one or more tracks to the I-region; and write the data from the first group of one or more tracks sequentially to the I-region, wherein a sequentially first track of the first group of one or more tracks is written to the position.

11. The device of claim 10, wherein the controller is further configured to:
create a buffer track in the I-region, wherein creating the buffer track comprises refraining from writing the data from the first group of one or more tracks to at a sequentially first track of the second group of consecutive tracks.

12. The device of claim 11, wherein the position indicates a sequentially second track of the second group of consecutive tracks.

13. The device of claim 11, wherein the controller is further configured to:
create a second buffer track in the I-region, wherein creating the second buffer track comprises refraining from writing the data from the first group of one or more tracks to at a track following the sequentially last track of the first group of tracks after the first group of tracks is written to the I-region.

14. The device of claim 10, wherein the controller is further configured to:
receive a second request to sequentially write the data stored in the first group of the one or more tracks to the I-region of the storage device;
move data stored in a third group of one or more consecutive tracks of the plurality of tracks from the I-region to the E-region of the storage device, wherein the third group has a cardinality equal to a number of tracks that must be moved for the first group to be capable of being written sequentially in the I-region, wherein the tracks in the first group of one or more tracks are different than the tracks in the third group of one or more consecutive tracks, and wherein the third group of one or more consecutive tracks are different than the second group of one or more consecutive tracks;
determine a second position of the I-region where data from one of the one or more tracks of the third group was previously stored, wherein the position indicates a starting point for writing the first group of one or more tracks to the I-region; and
write the data from the first group of one or more tracks sequentially to the I-region, wherein a sequentially first track of the first group of one or more tracks is written to the second position.

15. The device of claim 14, wherein the controller is further configured to:
create a buffer track in the I-region, wherein creating the buffer track comprises refraining from writing the data from the first group of one or more tracks to a sequentially first track of the third group of consecutive tracks, wherein the second position indicates a sequentially second track of the third group of consecutive tracks.

16. The device of claim 10, wherein the request is a second request, and wherein the controller is further configured to:

receive a first request to sequentially write data stored in the first group of one or more tracks to the I-region of the storage device;

write data stored in a portion of the first group of one or more tracks to the E-region of the storage device; and write data stored in a remainder of the first group of one or more tracks to the I-region where the data of the portion of the first group was previously stored.

17. The device of claim 10, wherein the cardinality of the second group of one or more consecutive tracks is dictated by a head width of the storage device and one or more constraints of the storage device.

18. The device of claim 10, wherein the controller is further configured to:

receive a second request to sequentially write data stored in the first group of one or more tracks to the I-region of the storage device;

determine that the data stored in the first group of one or more tracks has been previously re-written to the I-region;

determine a second position that is the same track as the sequentially first track of the first group of one or more tracks; and write the data from the first group of one or more tracks sequentially to the I-region, wherein the sequentially first track of the first group of one or more tracks is written to the second position.

19. A device comprising:

means for receiving a request to sequentially write data stored in a first group of one or more tracks of a plurality of tracks to an I-region of a storage device, wherein the I-region comprises the plurality of tracks, and wherein the plurality of tracks were previously written to the I-region;

means for moving data stored in each track of a second group of one or more consecutive tracks of the plurality of tracks from the I-region to an E-region of the storage device, wherein the second group has cardinality equal to a number of tracks that must be moved for the first group to be capable of being written sequentially in the I-region, wherein the tracks in the first group of one or more tracks are different than the tracks in the second group of one or more consecutive tracks, and wherein the E-region comprises a portion of the storage device reserved for temporary storage;

means for determining a position of the I-region where data from one of the one or more tracks of the second group was previously stored, wherein the position indicates a starting point for writing the first group of one or more tracks to the I-region; and means for writing the data from the first group of one or more tracks sequentially to the I-region, wherein a sequentially first track of the first group of one or more tracks is written to the position.

20. The device of claim 19, wherein the position indicates a sequentially second track of the second group of consecutive tracks, the device further comprising:

means for creating a buffer track in the I-region, wherein creating the buffer track comprises refraining from writing the data from the first group of one or more tracks to a sequentially first track of the second group of consecutive tracks; and means for creating a second buffer track in the I-region, wherein creating the second buffer track comprises refraining from writing the data from the first group of one or more tracks to a track following the sequentially last track of the first group of tracks after the first group of tracks is written to the I-region.

* * * * *